US012790984B2

(12) United States Patent
Moore et al.

(10) Patent No.: US 12,790,984 B2
(45) Date of Patent: Nov. 10, 2026

(54) AIRCRAFT POWER AND PROPULSION SYSTEM

(71) Applicant: ROLLS-ROYCE plc, London (GB)

(72) Inventors: Gareth E Moore, Nottingham (GB); Paul R Davies, Bristol (GB); Stephen M Husband, Derby (GB); David R Trainer, Derby (GB); David P Scothern, Derby (GB); Luke George, Derby (GB); Douglas M M Herbert, Derby (GB)

(73) Assignee: ROLLS-ROYCE plc, London (GB)

( * ) Notice: Subject to any disclaimer, the term of this patent is extended or adjusted under 35 U.S.C. 154(b) by 74 days.

(21) Appl. No.: 17/988,341

(22) Filed: Nov. 16, 2022

(65) Prior Publication Data

US 2023/0182920 A1 Jun. 15, 2023

(30) Foreign Application Priority Data

Dec. 14, 2021 (GB) .................................... 2118039

(51) Int. Cl.

*B64D 27/33* (2024.01)
*B64D 27/35* (2024.01)
(Continued)

(52) U.S. Cl.

CPC ................ *F02C 7/36* (2013.01); *B64D 27/33* (2024.01); *B64D 27/35* (2024.01); *B64D 31/06* (2013.01);
(Continued)

(58) Field of Classification Search

CPC .... B64D 2221/00; B64D 27/33; B64D 31/18; B64D 35/022; F02C 7/36; F02C 7/32; H02J 2310/44
See application file for complete search history.

(56) References Cited

U.S. PATENT DOCUMENTS 3,696,612 A 10/1972 Berman
4,594,850 A 6/1986 Joy
(Continued)

FOREIGN PATENT DOCUMENTS

EP 2 728 141 A2 5/2014
EP 2 779 427 A2 9/2014
(Continued)

OTHER PUBLICATIONS

May 24, 2024 U.S. Office Action issued in U.S. Appl. No. 17/988,393.
(Continued)

*Primary Examiner* — Thomas P Burke
(74) *Attorney, Agent, or Firm* — Oliff PLC

(57) ABSTRACT

A twin-engine aircraft power and propulsion system including first and second propulsive gas turbine engines, each having combustion equipment and a first and second spool; first, second, third, and fourth electrical power generation sub-systems including electric machines respectively mechanically coupled with the first spool of the first propulsive gas turbine engine, the second spool of the first propulsive gas turbine engine, the first spool of the second propulsive gas turbine engine, and the second spool of the second propulsive gas turbine engine; and first, second, third, and fourth power channels respectively connected with distribution sides of the first electric machine, second electric machine, third electric machine, and fourth electric machine.

16 Claims, 4 Drawing Sheets

(51) Int. Cl.

| | |
|---|---|
| ***B64D 31/06*** | (2006.01) |
| ***B64D 35/024*** | (2024.01) |
| ***F01D 15/10*** | (2006.01) |
| ***F02C 7/32*** | (2006.01) |
| ***F02C 7/36*** | (2006.01) |
| ***H02J 4/00*** | (2006.01) |
| ***H02K 7/18*** | (2006.01) |
| *B64D 41/00* | (2006.01) |
| *H02J 105/30* | (2026.01) |

(52) U.S. Cl.
CPC ........... *B64D 35/024* (2024.01); *F01D 15/10* (2013.01); *F02C 7/32* (2013.01); *H02J 4/00* (2013.01); *H02K 7/18* (2013.01); *B64D 2041/002* (2013.01); *B64D 2221/00* (2013.01); *H02J 2105/32* (2026.01)

(56) References Cited

U.S. PATENT DOCUMENTS

| | | | | |
|---|---|---|---|---|
| 5,309,029 | A | 5/1994 | Gregory et al. | |
| 5,486,553 | A | 1/1996 | Deaner et al. | |
| 5,539,027 | A | 7/1996 | Deaner et al. | |
| 6,992,403 | B1 * | 1/2006 | Raad | F02C 7/275 290/10 |
| 9,515,597 | B2 | 12/2016 | O'Donnell | |
| 10,583,931 | B2 | 3/2020 | Cline et al. | |
| 11,549,464 | B2 | 1/2023 | Terwilliger et al. | |
| 2006/0042252 | A1 | 3/2006 | Derouineau | |
| 2006/0168968 | A1 | 8/2006 | Zielinski et al. | |
| 2008/0072571 | A1 * | 3/2008 | Beardsley | F02K 1/72 60/226.2 |
| 2008/0110151 | A1 | 5/2008 | Welch et al. | |
| 2008/0149445 | A1 | 6/2008 | Kern et al. | |
| 2009/0224599 | A1 | 9/2009 | Yue et al. | |
| 2009/0288421 | A1 | 11/2009 | Zeiner et al. | |
| 2011/0178648 | A1 | 7/2011 | Calvignac et al. | |
| 2012/0318914 | A1 | 12/2012 | Rajashekara et al. | |
| 2014/0260306 | A1 | 9/2014 | Dooley et al. | |
| 2014/0333127 | A1 * | 11/2014 | Edwards | H02J 4/00 307/9.1 |
| 2015/0123463 | A1 * | 5/2015 | Huang | B60R 16/03 307/9.1 |
| 2015/0300918 | A1 | 10/2015 | Greubel | |
| 2016/0052417 | A1 | 2/2016 | Zhou et al. | |
| 2016/0107588 | A1 * | 4/2016 | White | B60R 16/03 307/9.1 |
| 2016/0195025 | A1 | 7/2016 | Ajami et al. | |
| 2016/0215729 | A1 | 7/2016 | Sabnis | |
| 2018/0003072 | A1 * | 1/2018 | Lents | B64D 31/06 |
| 2018/0097427 | A1 | 4/2018 | Auker et al. | |
| 2018/0112599 | A1 | 4/2018 | Dalal | |
| 2018/0138716 | A1 | 5/2018 | Bailey et al. | |
| 2018/0216526 | A1 | 8/2018 | Dalal et al. | |
| 2018/0278127 | A1 | 9/2018 | Huang et al. | |
| 2018/0291807 | A1 | 10/2018 | Dalal | |
| 2018/0339790 | A1 | 11/2018 | Huang | |
| 2018/0354632 | A1 | 12/2018 | Hon et al. | |
| 2019/0085765 | A1 | 3/2019 | Nolcheff et al. | |
| 2019/0118960 | A1 * | 4/2019 | Izquierdo Gil | H02J 3/38 |
| 2019/0181669 | A1 | 6/2019 | Solodovnik et al. | |
| 2019/0181786 | A1 * | 6/2019 | Singh | B64D 41/00 |
| 2019/0257250 | A1 | 8/2019 | Veilleux, Jr. et al. | |
| 2019/0376405 | A1 | 12/2019 | Lavoie et al. | |
| 2020/0106336 | A1 | 4/2020 | Klaus et al. | |
| 2020/0173369 | A1 | 6/2020 | Husband et al. | |
| 2020/0180454 | A1 * | 6/2020 | Gao | H02J 7/14 |
| 2020/0191010 | A1 | 6/2020 | Tan-Kim et al. | |
| 2020/0290742 | A1 * | 9/2020 | Kumar | B64D 35/024 |
| 2020/0309039 | A1 | 10/2020 | Smith | |
| 2020/0392859 | A1 * | 12/2020 | Turner | F02K 5/00 |
| 2020/0392903 | A1 * | 12/2020 | Turner | F02C 9/54 |
| 2020/0392909 | A1 | 12/2020 | Turner | |
| 2021/0070458 | A1 | 3/2021 | Sanders et al. | |
| 2021/0101692 | A1 | 4/2021 | Fox | |
| 2021/0115857 | A1 | 4/2021 | Collopy | |
| 2021/0172382 | A1 * | 6/2021 | Bruce | H02M 7/23 |
| 2021/0387723 | A1 | 12/2021 | Moon et al. | |
| 2021/0396185 | A1 | 12/2021 | Duscha | |
| 2022/0063826 | A1 | 3/2022 | Hiett et al. | |
| 2022/0290616 | A1 | 9/2022 | Okuwa et al. | |
| 2023/0167785 | A1 | 6/2023 | Davies et al. | |

FOREIGN PATENT DOCUMENTS

| | | | |
|---|---|---|---|
| EP | 2 801 719 | A1 | 11/2014 |
| EP | 3 208 429 | A1 | 8/2017 |
| EP | 3 415 436 | A1 | 12/2018 |
| EP | 3344545 | B1 | 6/2019 |
| EP | 3 578 464 | A1 | 12/2019 |
| EP | 3 597 883 | A1 | 1/2020 |
| EP | 3 609 035 | A1 | 2/2020 |
| EP | 3 793 050 | A1 | 3/2021 |
| EP | 3 793 051 | A1 | 3/2021 |
| EP | 3 796 502 | A1 | 3/2021 |
| EP | 3 832 097 | A1 | 6/2021 |
| EP | 3 943 398 | A1 | 1/2022 |
| FR | 2961767 | A1 | 12/2011 |
| GB | 2 422 875 | A | 8/2006 |
| GB | 2 542 920 | A | 4/2017 |
| WO | 2014/143218 | A1 | 9/2014 |
| WO | 2015/034517 | A1 | 3/2015 |
| WO | 2017/066223 | A1 | 4/2017 |

OTHER PUBLICATIONS

May 9, 2023 Search Report issued in European Patent Application No. 22208027.7.

May 17, 2023 Extended Search Report issued in European Patent Application No. 22208019.4.

Jun. 2, 2023 extended Search Report issued in European Patent Application No. 22208020.2.

Jun. 6, 2023 extended Search Report issued in European Patent Application No. 22208025.1.

Jun 14, 2022 Search Report issued in GB Patent Application No. 2118039.3.

Jun. 13, 2022 Search Report issued in GB Patent Application No. 2118040.1.

Jun. 14, 2022 Search Report issued in GB Patent Application No. 2118041.9.

Jun. 14, 2022 Search Report issued in GB Patent Application No. 2118044.3.

Jun. 14, 2022 Search Report issued in GB Patent Application No. 2118045.0.

U.S. Appl. No. 17/988,538, filed Nov. 16, 2022 in the name of Moore et al.

U.S. Appl. No. 17/988,393, filed Nov. 16, 2022 in the name of Moore et al.

U.S. Appl. No. 17/988,504, filed Nov. 16, 2022 in the name of Moore et al.

U.S. Appl. No. 17/988,371, filed Nov. 16, 2022 in the name of Moore et al.

Dec. 15, 2023 Notice of Allowance issued in U.S. Appl. No. 17/988,504.

Feb. 6, 2024 U.S. Office Action issued in U.S. Appl. No. 17/988,393.

Jane's Aero-Engines, Issue Seven, Edited by Bill Gunston, Jane's Information Group Inc., Alexandria, Virginia, 2000, pp. 1-47 and 510-512. (Year: 2000).

Noor Zainab Hussain, Rolls-Royce hit by further setback to fixing Boeing 787 engines, Sep. 20, 2019, Reuters, Aerospace and Defense, pp. 1-4, URL: https://www.reuters.com/article/us-rolls-royce-hldg-trent-1000/ rolls-royce-hit-by-further-setback-to-fixing-boeing-787-engines-idUSKBN1W50MP (Year: 2019).

Jun. 14, 2023 Office Action issued in U.S. Appl. No. 17/988,504.

Jul. 14, 2023 extended Search Report issued in European Patent Application No. 22208022.8.

(56) References Cited

OTHER PUBLICATIONS

Jul. 14, 2026 Notice of Allowance issued in U.S. Appl. No. 17/988,371.

* cited by examiner

AIRCRAFT POWER AND PROPULSION SYSTEM

CROSS-REFERENCE TO RELATED APPLICATIONS

This specification is based upon and claims the benefit of priority from United Kingdom Patent Application No. 2118039.3, filed 14 Dec. 2021, the entire contents of which are incorporated herein by reference.

TECHNICAL FIELD

This disclosure concerns aircraft power and propulsion systems and to methods of operating power and propulsion systems of aircraft.

BACKGROUND

In aerospace, there is a trend towards aircraft and their propulsion systems becoming 'more electric' in their design. For example, aircraft and engine systems and accessories which have previously been mechanically, pneumatically or hydraulically powered may be replaced with electrically powered equivalents. Spool-coupled electric machines such as starter generators may be used to generate electrical power to power the electrical loads.

Extracting mechanical power from the spools of gas turbine engines impacts their operability, for example their surge margins. At the same time, electrifying aircraft and engine systems that have previously been mechanically powered, for example, may increase not only the total electrical loading but also the criticality of the loading of the aircraft's electrical power system. Future aircraft power and propulsion systems may therefore have competing demands.

SUMMARY

According to a first aspect, there is provided a twin-engine aircraft power and propulsion system, comprising: first and second propulsive gas turbine engines, each comprising combustion equipment and a plurality of spools including a first spool and a second spool; a first electrical power generation sub-system comprising a first electric machine mechanically coupled with the first spool of the first propulsive gas turbine engine; a second electrical power generation sub-system comprising a second electric machine mechanically coupled with the second spool of the first propulsive gas turbine engine; a third electrical power generation sub-system comprising a third electric machine mechanically coupled with the first spool of the second propulsive gas turbine engine; a fourth electrical power generation sub-system comprising a fourth electric machine mechanically coupled with the second spool of the second propulsive gas turbine engine; a first power channel connected with a distribution side of the first electric machine of the first electrical power generation sub-system; a second power channel connected with a distribution side of the second electric machine of the second electrical power generation sub-system; a third power channel connected with a distribution side of the third electric machine of the third electrical power generation sub-system; and a fourth power channel connected with a distribution side of the fourth electric machine of the fourth electrical power generation sub-system.

The combination of dual spool power generation from two gas turbine engines and four power channels advantageously allows a large amount of power to be extracted so that a large electrical loading with a relatively high degree of criticality can be powered, all with a manageable and acceptable impact on engine surge margin.

Each of the first to fourth power channels may be dc power channels, and each of the first to fourth electric machines may be connected with its respective dc power channel via an ac-dc converter. In some embodiments, each of the first to fourth electric machines may be connected with two different dc power channels via two ac-dc converters (i.e. such that there are eight ac-dc converters).

Aircraft conventionally utilize ac power channels, partly because the use of ac has advantages in terms of lower cost and weight due to a reduced need for power electronics converters. However, it has been found that the use a dc distribution system can provide some significant advantages. This is because the use of ac power channels necessitates that all electrical generators providing power to an ac channel output their power at the same frequency. In a multi-spool gas turbine engine, each of the spools will rotate at a different speed at essentially any engine operating point. Whilst variable frequency drives (VFDs) may be used to provide common, preferably constant, frequency ac outputs from electric machines and associated spools operating at different speeds, this may be in practice be difficult to implement with an acceptable level of power quality. This may in practice mean that the use of an ac system limits the amount of power which can be received by a single power channel and provided to a single engine spool. The amount of power that can extracted from a spool is not only limited by its rotational speed, which can be relatively low at some operating points, but by the affect the extraction will have on e.g. engine surge margin. Thus, with an ac distribution system, the extraction or delivery of large amounts of electrical power may first require a change in engine operating point so that sufficient power can be extracted from the single spool without excessive impact on surge margin. This may introduce a delay in performing particular operations and manoeuvres, and can also increase the associated fuel consumption. By using dc power channels, power can be sourced from multiple spools of a multi-spool engine, which reduces the impact the extraction has on the engine surge margin. Furthermore, with dc power channels, dc power can be simultaneously sourced and sinked from both engine spools and energy storage systems, providing further flexibility. The use of dc power channels may therefore increase the envelope in which operations and manoeuvres can be performed, and may reduce the need to change engine operating points to perform them.

In some embodiments, each of the first to fourth electric machines comprises a first sub-machine and a second sub-machine. The term "sub-machine" of an electric machine will be understood by those skilled in the art to refer to one of a plurality of functionally separate electric machines which share some common structure. In other words, each sub-machine is capable of generating separate electrical power or torque (depending on the mode of the operation, i.e. generator mode or motor mode), but each one of the plurality of sub-machines is not totally physically independent from the other sub-machines and thus all of the sub-machines must be deployed together. For example, two sub-machines of an electric machine may share a common rotor but have completely independent stators; they may some common stator structure (e.g. a common back iron or yoke) but have separate stator field windings; or they may be integrated together in a common casing with common support structures and cooling systems. Thus, an electric machine with two sub-machines may be considered to be an integrated arrangement of two functionally separate electric machines.

Providing each electric machine in the form of two sub-machines provides further redundancy and fault tolerance. For example, each power generation sub-system may be able provide power even after the total loss of a sub-machine. With sufficient sub-machine over-rating, each sub-system may be able to provide the fully rated or almost fully rated sub-system power with the partial loss (e.g. phase loss) or total loss of a sub-machine.

The first power channel may be connected with a distribution side of the first sub-machine of the first electric machine and a distribution side of the first sub-machine of the second electric machine. The second power channel may be connected with a distribution side of the second sub-machine of the first electric machine and a distribution side of the second sub-machine of the second electric machine. The third power channel may be connected with a distribution side of the first sub-machine of the third electric machine and a distribution side of the first sub-machine of the fourth electric machine. The fourth power channel may be connected with a distribution side of the second sub-machine of the third electric machine and a distribution side of the second sub-machine of the fourth electric machine. Thus, each power channel may be able to receive power from two electric machines coupled with different spools. Combined with the dual-redundancy provided by the sub-machines, there is a particularly high degree of fault tolerance without the addition of substantial weight to the power and propulsion system.

Where each electric machine includes first and second sub-machines, and each of the first to fourth power channels are dc power channels, each of the first and second sub-machines of each of the first to fourth electric machines may be connected with its respective dc power channel via an ac-dc converter. Utilizing one power electronics converter per sub-machine provides further fault tolerance.

The aircraft power and propulsion system may further comprise: a first bus tie operable to connect together the first and third power channels, whereby electrical power generated by the first electrical power generation sub-system can be transferred to the third electrical power generation sub-system and vice versa; and/or a second bus tie operable to connect together the second and fourth power channels, whereby electrical power generated by the second electrical power generation sub-system can be transferred to the fourth electrical power generation sub-system and vice versa. The ability to connect the power channels facilitates the transfer of power between engines, which allows for functionality such as cross-engine start and cross-engine restart. Furthermore, it further increases fault tolerance as the impact of a failure associated within one engine or its portion of the electrical power system can be reduced by the other engine and its portion of the electrical power system.

The aircraft power and propulsion system may further comprise a current limiting diode (CLD) operable to limit an amount of current that can flow between the first and third power channels; and/or a CLD to limit an amount of current that can flow between the second and fourth power channels. The CLD(s) may be bi-directional CLDs, for example two CLDs connected in anti-parallel. The use of CLDs may protect the system against current spikes which may occur due to faults and transients in the power generation sub-systems or electrical loads.

The aircraft power and propulsion system may further comprise a control system configured to selectively open and close the first and/or second bus ties according to a detected condition of the power and propulsion system. The condition may be a condition to the effect that: there is fault in the power and power and propulsion system, for example in an engine, a power generation sub-system or a power channel; a flame in the combustion equipment of one engine has been extinguished, such that a cross-engine electrically-assisted restart may be desired; or a cross-engine electrically-assisted start is desired.

A ratio, $P_1/T$, equal to the combined rated power of the first and third electric machines divided by the combined maximum thrust rating of the first and second gas turbine engines, may be greater than or equal to 2.0 $WN^{-1}$. The thrust rating is a dry thrust rating (i.e. without the use of reheat/afterburner, if such a system is present in the engine). The first spool may be an intermediate pressure (IP) spool of the gas turbine engine. The term "intermediate pressure spool" will be understood to refer to a spool which is neither the highest pressure nor the lowest pressure spool of the engine. In other embodiments, the first spool is a low pressure (LP) spool of the gas turbine engine. The term "low pressure spool" will be understood to refer to the lowest pressure spool of the gas turbine engine. In some embodiments, the LP spool drives a fan via a reduction gearbox so that the fan rotates at a lower speed than the LP spool. The value of the ratio, $P_1/T$, may be significantly higher than in conventional platforms. The value of the ratio, $P_1/T$, may be greater than 2.5 $WN^{-1}$, greater than 3.0 $WN^{-1}$, or even greater than 3.5 $WN^{-1}$. The value of the ratio, $P_1/T$, may be less than 7.0 $WN^{-1}$, less than 6.5 $WN^{-1}$, less than 6.0 $WN^{-1}$, or less than 5.5 $WN^{-1}$. The value of the ratio, $P_1/T$, may be between 2.5 $WN^{-1}$ and 6.0 $WN^{-1}$ or between 3.0 $WN^{-1}$ and 5.5 $WN^{-1}$. In one embodiment the value of the ratio, $P_1/T$, is between 3.5 $WN^{-1}$ and 5.0 $WN^{-1}$.

A ratio, $P_2/T$, equal to the combined rated power of the second and fourth electric machines divided by the combined maximum thrust rating of the first and second gas turbine engines, may be greater than or equal to 3.5 $WN^{-1}$. The thrust rating is a dry thrust rating (i.e. without the use of reheat/afterburner, if such a system is present in the engine). The second spool may be a high pressure (HP) spool of the gas turbine engine. The term "high pressure spool" will be understood to refer to the highest pressure spool of the engine. The value of the ratio, $P_2/T$, may be significantly higher than in conventional platforms. The value of the ratio, $P_2/T$, may be greater than 4.0 $WN^{-1}$, greater than 4.5 $WN^{-1}$, greater than 5.0 $WN^{-1}$ or even greater than 5.5 $WN^{-1}$. The value of the ratio, $P_2/T$, may be less than 10.0 $WN^{-1}$, less than 9.5 $WN^{-1}$, less than 9.0 $WN^{-1}$, or less than 8.5 $WN^{-1}$. The value of the ratio, $P_2/T$, may be between 4.0 $WN^{-1}$ and 9.5 $WN^{-1}$, between 4.5 $WN^{-1}$ and 9.0 $WN^{-1}$, between 5.0 $WN^{-1}$ and 8.5 $WN^{-1}$ or between 5.5 $WN^{-1}$ and 8.0 $WN^{-1}$. In one embodiment the value of the ratio, $P_2/T$, is between 6.0 $WN^{-1}$ and 7.5 $WN^{-1}$. In another embodiment the electric machines of the first and second spool are equally rated, e.g. $P_1/T$ and $P_2/T$ may have equal or substantially equal values greater than or equal to 2.0 $WN^{-1}$.

A ratio, $P_{TOT}/T$, equal to the combined rated power of the first to fourth electric machines divided by the combined maximum thrust rating of the first and second gas turbine engines may be may be greater than or equal to 3.5 $WN^{-1}$. The thrust rating is a dry thrust rating (i.e. without the use of reheat/afterburner, if such a system is present in the engine). The ratio may be greater than 4.0 $WN^{-1}$, greater than 4.5 $WN^{-1}$, greater than 5.0 $WN^{-1}$, greater 5.5 $WN^{-1}$, or even greater than 6.0 $WN^{-1}$. The ratio may be less than 15.0

$WN^{-1}$. In one group of embodiments, the ratio is between 4.5 $WN^{-1}$ and 13 $WN^{-1}$, preferably between 5.0 $WN^{-1}$ and 12 $WN^{-1}$. In an embodiment, the ratio is between 8.5 $WN^{-1}$ and 12 $WN^{-1}$.

One or more, and optionally all, of the first to fourth electric machines may be embedded with a core of the respective gas turbine engine. In some embodiments the second and fourth electric machines are embedded within the core of their respective engine. Embedding electric machines within the core may reduce weight and mechanical losses associated with, for example, coupling machines to spools through tower shafts or auxiliary gearboxes.

Each of the first and second propulsive gas turbine engines may further comprise: an electrically powered fuel pump arranged to receive electrical power from one or more of the first to fourth dc power channels and to supply fuel to the combustion equipment. The electrically-powered fuel pump may receive its electrical power from one or more of the power channels. Thus, the fuel pump is powered as long as there is electrical power available in the electrical system. This may be in contrast to fuel pumps of conventional gas turbine engines in which the fuel pump(s) are powered as long as the spools of the gas turbine are rotating. For example, a fuel pump is conventionally either mechanically driven by a spool of the engine (e.g. through an accessory gearbox (AGB)) or powered by the output a dedicated variator arrangement which has mechanical power from a spool of the engine as one if its inputs (e.g. through an AGB). Utilizing an electrically-powered fuel pump, however, allows for a reduction in weight and mechanical losses due to a reduction in mechanical parts, and may allow faster and more precise control over the delivery of fuel to the combustion equipment. This may, for example, allow for more precise control of the fuel-to-air ratio in the combustion equipment, and may allow for a faster engine restart and/or a wider restart envelope. More precise control of the amount of fuel delivered to the combustion equipment may also allow for a general reduction in total fuel delivered, which not only reduces fuel consumption and the generation of waste heat, but reduces the amount of power required to drive the fuel pump.

The aircraft power and propulsion system may further comprise an electrical energy storage system connected with each of the first to fourth power channels. The energy storage system may take the form of one or more batteries and/or one or more supercapacitors. It is also contemplated that fuel cells may be used. However, batteries and/or supercapacitors may be preferred to fuel cells because fuel cells, as well not being re-chargeable during flight, generally require or benefit from a level of ambient pressure not available at high altitude. If, however, the aircraft is deployed for lower-altitude flight or the fuel cell can be provided in a suitably pressurized environment, fuel cells could be used.

The energy storage system may have a high energy storage capacity relative to the platform power. For example, a ratio defined as a total energy storage capacity of the electrical energy storage system divided by: a combined maximum rated thrust of the first and second propulsive gas turbine engines, may be greater than or equal to 0.1 $WhN^{-1}$. The ratio may be between 0.15 and 0.50 $WhN^{-1}$. In an embodiment the ratio is between 0.18 and 0.45 $WhN^{-1}$. In one group of embodiments the ratio is between 0.18 and 0.28 $WhN^{-1}$. In another group of embodiments the ratio is between 0.25 and 0.42 $WhN^{-1}$.

A portion of the electrical energy storage system, for example one or more battery cells or battery modules of a larger number of cells or modules which make up the electrical energy storage system, may be dedicated to supplying electrical power to one or more electrical loads during engine restart attempts. The one or more electrical loads may comprise one or more of: one or more of the first to fourth electrical machines; and/or one or more electrically powered fuel pumps configured to supply fuel to the combustion equipment of the first and second propulsive gas turbine engines.

A portion of the electrical energy storage system, for example one or more battery cells or battery modules of a larger number of cells or modules which make up the electrical energy storage system, may be dedicated to supplying electrical power to one or more of the first to fourth electric machines to manage engine surge margin. One or more of the electric machines may intermittently be operated as motors to accelerate one or more spools to improve surge margin and/or reduce peak turbine temperatures, for example during engine transients such as accelerations and aircraft manoeuvres. The dedicated portion of the energy storage system may supply the power used by the electric machine(s) during these intermittent operations.

The aircraft power and propulsion system may further comprise one or more platform power distribution lanes connected with each of the first to fourth power channels. The one or more platform power distribution lanes may be IT (isolé-terre) grounded (i.e. IT earthed). IT grounding of electrical systems is defined in International standard IEC 60364.

Each engine may be a two or three spool engine. Each engine may comprise a fan driven by its low pressure (LP) spool, optionally via a gearbox. For each of the first and second propulsive gas turbine engines, the first spool may be an LP spool of a two spool engine or an intermediate pressure (IP) spool of a three spool engine. The second spool may be is a high pressure (HP) spool of a two or three spool engine.

Each propulsive gas turbine engine may be of any suitable type, for example of the ducted fan type (e.g. a turbofan) or the unducted, open rotor, type.

According to a second aspect, there is provided the control system of the first aspect. The control system may take the form of a controller or one or more controllers, each of which may be implemented in hardware, software of a combination of the two. The control system may comprise one or more functional modules of a wider control system. In some embodiments, the control system is or is part of an Electronic Engine Controller (EEC), Engine Control Unit (ECU) or Full Authority Digital Engine Controller (FADEC).

According to a third aspect, there is provided an aircraft comprising the power and propulsion system of the first aspect.

According to a fourth aspect, there is provided a method of operating a twin-engine aircraft power and propulsion system. The method comprises: using a first electric machine of a first electrical power generation sub-system, extracting mechanical power from a first spool of a first propulsive gas turbine engine of the aircraft and generating electrical power therefrom, and delivering the generated electrical power to a first power channel; using a second electric machine of a second electrical power generation sub-system, extracting mechanical power from a second spool of the first propulsive gas turbine engine and generating electrical power therefrom, and delivering the generated electrical power to a second power channel; using a third electric machine of a third electrical power generation sub-system, extracting mechanical power from a first spool of a second propulsive gas turbine engine of the aircraft and generating electrical power therefrom, and delivering the generated electrical power to a third power channel; and using a fourth electric machine of a fourth electrical power generation sub-system, extracting mechanical power from a second spool of the second propulsive gas turbine engine and generating electrical power therefrom, and delivering the generated electrical power to a fourth power channel.

The method may further comprise: supplying electrical power from an electrical energy storage system (ESS) to one or more of the first to fourth electric machines in order to maintain surge margins and/or reduce peak turbine temperatures of the first and second propulsive gas turbine engines.

The method may further comprise: maintaining a state of charge of the ESS above a predetermined minimum level using electrical power generated by the first to fourth electrical power generation sub-systems. Thus, critical capabilities such as surge margin maintenance and electrically-assisted engine restart may always be available.

The method may further comprise: during take-off of the aircraft and/or a climb manoeuvre of the aircraft, supplying electrical power from an ESS to one or more of the first to fourth electric machines and operating said one or more electric machines as motors in order to increase speeds of one or more of the first and second spools of the first and second propulsive gas turbine engines. Thus, the ESS may be utilized during take-off or climb, for example to add power to the engine spools to reduce fuel consumption, noise or turbine temperatures during these flight stages. After this, power generated by the first to fourth electric machines may be used to recharge the ESS to at least a pre-defined level so that the ESS is in a state of readiness to perform critical capabilities, for example surge margin maintenance or the powering of critical loads following a fault or unexpected engine shutdown.

The amount and fraction of the power extracted from the engine spools by the electric machines to power the electrical loads may be higher than in conventional systems. For example, in some embodiments, a peak value of the percentage of the total combined shaft power of the plurality of spools of an engine extracted from the shafts and converted to electrical power may be greater than 5%. In some embodiments, the percentage may even be greater than 7%, 8% or even greater than 10%. Generally, the peak percentage will be less than 20%, and is preferably less than 15%. For example, the peak value may be in the range 7-15%.

Thus, the method may further comprise: extracting greater than 5% of a combined power of the first and second spools and generating electrical power from said extracted power. In some embodiments, between 7% and 15% of the combined power of the first and second spools is extracted and converted to electrical power.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
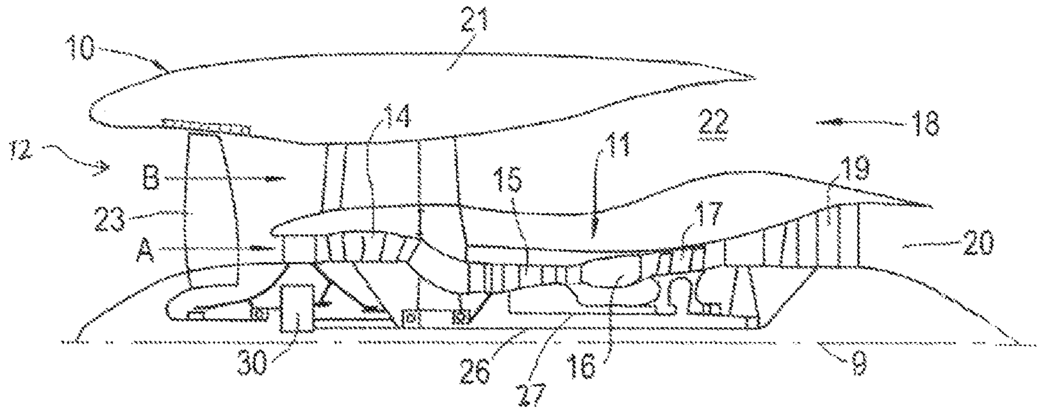
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

It will be understood that the low-pressure compressor 14, the low-pressure turbine 19 and the interconnecting shaft 26 together form the low-pressure spool. Similarly, the high-pressure compressor 15, the high-pressure turbine 17 and the interconnecting shaft 27 together form the high-pressure spool.

FIG. 2

Figure 2:
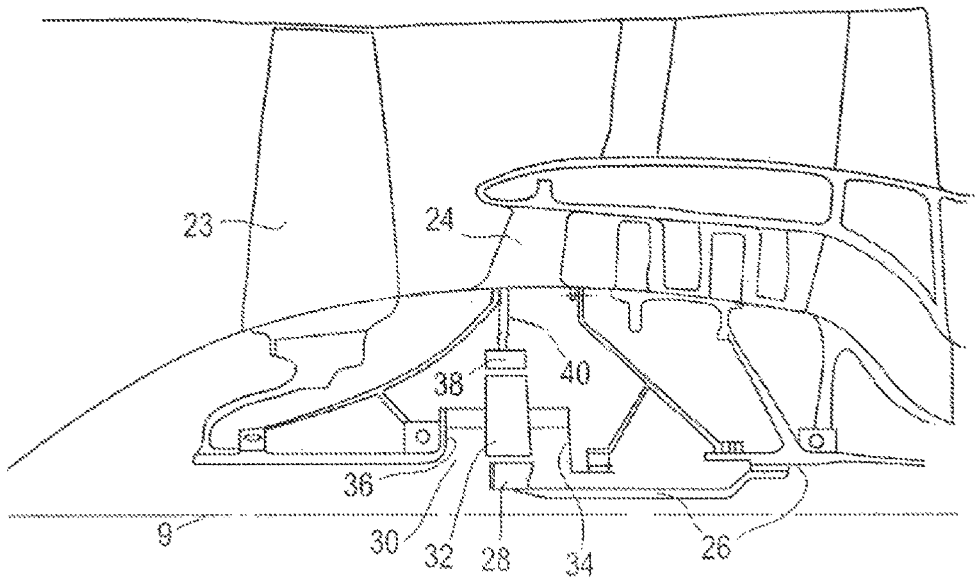
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3

Figure 3:
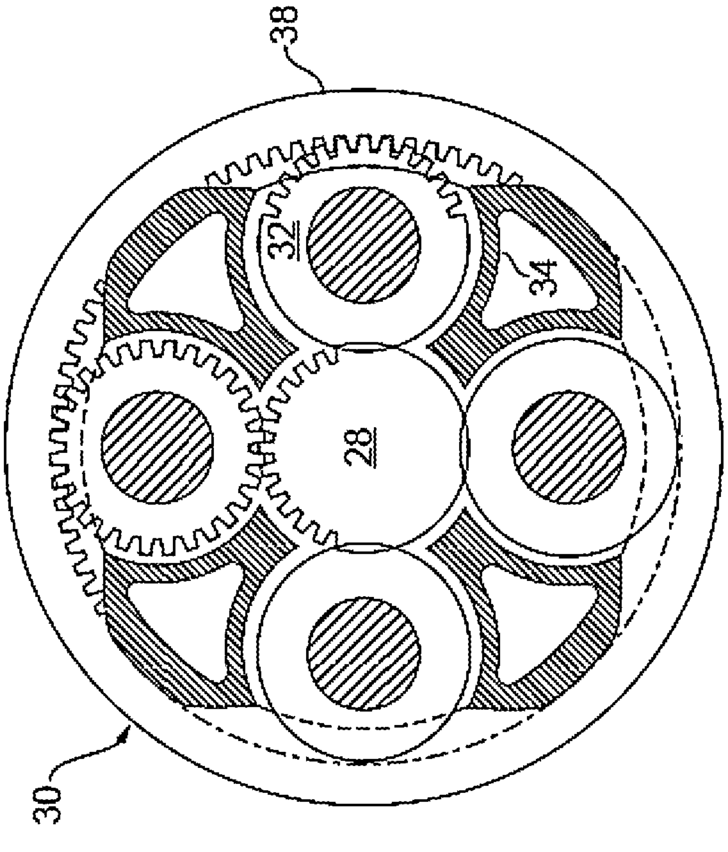
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4

Figure 4:
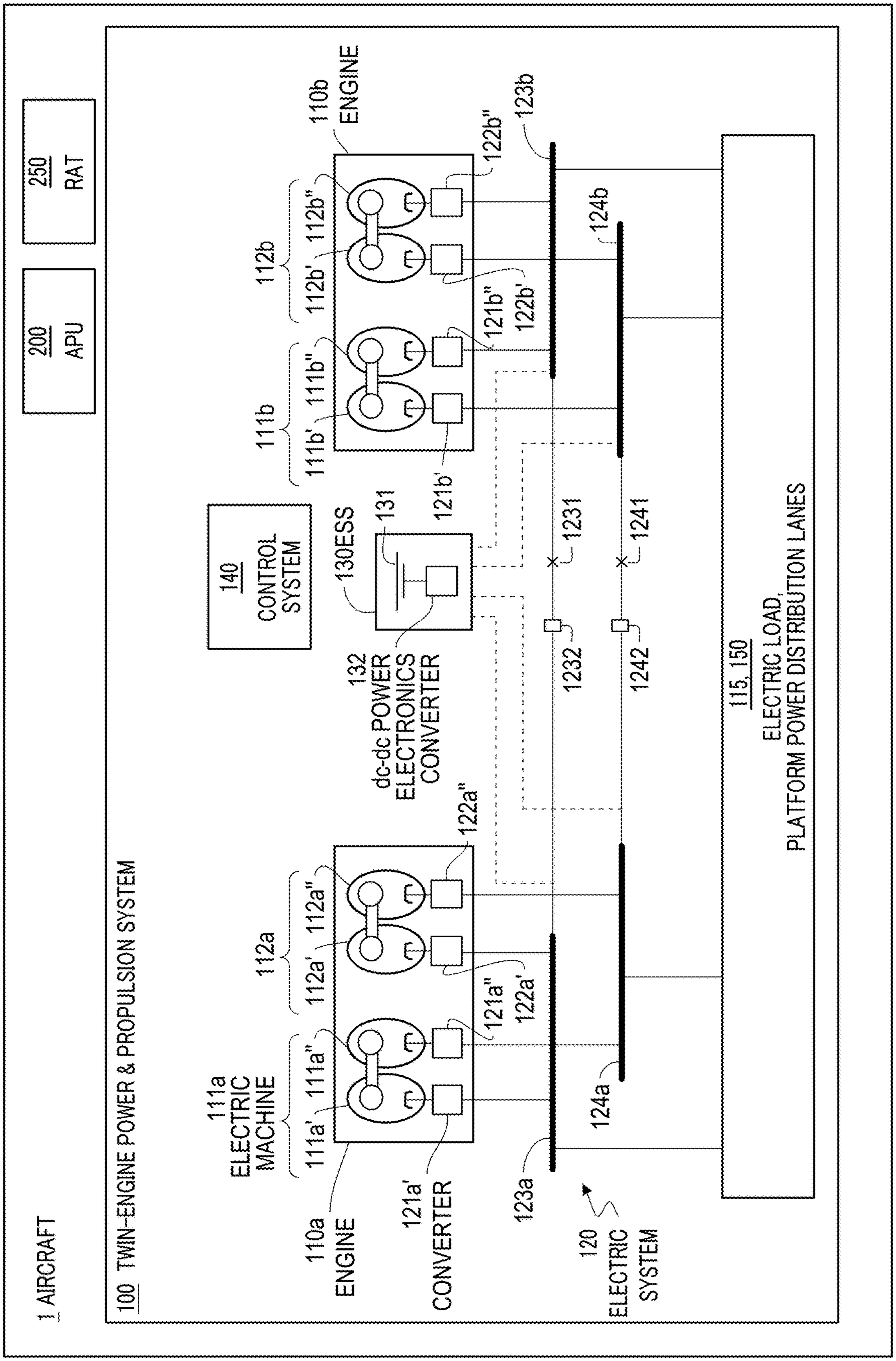
FIG. 4 is a schematic diagram of a twin-engine aircraft power and propulsion system including electric machines coupled with the spools of the engines.

FIG. 4 is a schematic illustration of an aircraft 1 with a twin-engine power and propulsion system 100.

The illustrated power and propulsion system 100 includes two propulsive gas turbine engines 110*a*, 110*b*. Each of the illustrated engines 110*a*, 110*b* has two spools: a first spool, which in this case is a low-pressure spool having a low-pressure compressor 14; a low-pressure turbine 19; and an interconnecting shaft 26, and a second spool, which in this case is a high-pressure spool having high-pressure compressor 15; a high-pressure turbine 17; and an interconnecting shaft 27. The engine could alternatively be of the three-spool type and/or could include a gearbox as described above with reference to FIGS. 1-3. The engines 110*a*, 110*b* may be of the low- or high-bypass turbofan type or another type, for example the open rotor type.

Each of the propulsive gas turbine engines 110*a*, 110*b* is associated with two electrical power generation sub-systems, each sub-system comprising an electric machine. Thus, in the illustrated system 100, each engine 110*a*, 110*b* includes two electric machines: a first electric machine 111*a*, 111*b* (hereafter electric machine 111) mechanically coupled with its first spool and a second electric machine 112*a*, 112*b* (hereafter electric machine 112) coupled with its second spool. Each of the machines 111, 112 is operable as both a motor and as a generator. Thus, each machine 111, 112 can either drive rotation of its spool to increase its speed, or extract mechanical power from its spool and generate electrical power therefrom.

In a preferred embodiment one or both of the electric machines 111, 112 are coaxially coupled with the shafts of the spools and embedded within the core of the respective engine. The electric machines 111, 112 could, however, be coupled with the spools in another manner, for example through an auxiliary gearbox using a radial/tower shaft arrangement.

In this embodiment each electric machine 111, 112 comprises two sub-machines: the first electric machine 111 comprises a first sub-machine 111' and a second sub-machine 111", and the second electric machine 112 comprises a first sub-machine 112' and a second sub-machine 112". The term "sub-machine" will be understood to refer to one of a plurality of functionally separate electric machines which are physically integrated together to some extent. For example, the electric machine 111 may be a dual-wound machine having a single, common rotor and a single stator structure featuring two independent sets of field windings, with the two independent sets of windings forming the two sub-machines 111', 111". Alternatively, each of the two sub-machines 111', 111" may have its own stator and its own rotor axially spaced apart from the rotor and stator of the other sub-machine, with some common structure such as a common casing or mounting arrangement. Other sub-machine arrangements will occur to those skilled in the art. The overall power rating of each electric machine is preferably equally or approximately equally split between its two sub-machines, though this need not necessarily be the case: a split of 40-60% and 60-40% could be used, for example.

Each electric machine 111, 112 can be of any suitable type known in the art. In a preferred embodiment each machine 111, 112 is of the permanent magnet type, but induction or switched-reluctance machines could also be used, for example. The machines 111, 112 are preferably of the radial flux or transverse flux type, but other arrangements could be used.

The power and propulsion system 100 further includes an electrical system 120. In the illustrated embodiment the electrical system 120 includes four power channels 123*a-b*, 124*a-b*, each of which is electrically connected with one or more of the electric machines 111*a-b*, 112*a-b*. In this case the power channels 123*a-b*, 124*a-b* are dc power channels which interface with the electric machines 111, 112 through ac-dc power electronics converters. The use of a dc electrical system allows a single power channel (or two or more connected power channels) to simultaneously receive electrical power from electric machines rotating at different speeds. This means that, for example, significant amounts of electrical power can be generated from one engine (e.g. engine 110*a*) even at low-power engine operating points. Additionally or alternatively, the ability to simultaneously generate power from two spools of the same engine may reduce the impact on the engine operating point. This allows the engine surge margin to be maintained during, for example, the simultaneous powering of electric loads and the recharging of an energy storage system.

Each electric machine 111, 112 is connected with the dc electrical system 120 via a set of one or more bidirectional ac-dc converters. Specifically, the first electric machine 111*a* of the first engine 110*a* has a first set of bidirectional ac-dc converters including a first converter 121*a*' for its first sub-machine 111*a*' and a second converter 121*a*" for is second sub-machine 111*a*". Likewise, the second electric machine 112*a* of the first engine 110*a* has a second set of bidirectional ac-dc converters, including a third converter 122*a*' for its first sub-machine 112*a*' and a fourth converter 122*a*" for its second sub-machine 112*a*". Third and fourth sets of bidirectional ac-dc converters, each having one converter for each of the two sub-machines, are provided for the electric machines 111*b*, 112*b* of the second engine 110*b*. The first electric machine 111*b* of the second engine 110*b* has a first set of bidirectional ac-dc converters including a first converter 121*b*' for its first sub-machine 111*b*' and a second converter 121*b*" for is second sub-machine 111*b*'. The second electric machine 112*b* of the second engine 110*b* has a second set of bidirectional ac-dc converters, including a third converter 122*b*' for its first sub-machine 112*b*" and a fourth converter 122*b*" for its second sub-machine 112*b*'.

Any suitable ac-dc converter topology may be used, for example H-bridges accompanied by appropriate filters.

In the illustrated embodiment, the dc-sides of the ac-dc converters 121*a-b*, 122*a-b* are connected with the dc power channels 123*a-b*, 124*b* so as to provide a high degree of re-configurability, and thus fault tolerance, in addition to simultaneous dual-spool power generation. Specifically, since each electric machine 111, 112 comprises two sub-machines, each electric machine can be connected with each of the two power channels of the set of channels associated with its engine. For the first engine 110*a*, the first sub-machine 111' of the first electric machine 111 is connectable with the first dc bus 123*a*, the second sub-machine 111" of the first electric machine 111 can be connected with the second dc bus 124*a*, the first sub-machine 112' of the second electric machine 111 can be connected with the first dc bus 123*a*, and the second sub-machine 112" of the second electric machine 112 can be connected with the second dc bus 124*a*. A corresponding arrangement applies to the second engine 110*b* and its set of dc power channels 123*b*, 124*b*.

In the illustrated embodiment, each engine 110*a*, 110*b* of the power and propulsion system 100 is associated with its own set of dc power channels, and the sets of dc power channels are selectively connectable with each other through bus ties. In this example, the first engine 110*a* is associated with a set of two channels 123*a*, 124*a*, and the second engine 110*b* is also associated a set of two channels 123*b*, 124*b*. The first channel 123*a* of the first set is connectable with the first channel 123*b* of the second set through a first bus tie 1231. The second channel 124*a* of the first set is connectable with the second channel 124*b* of the second set through a bus tie 1241. During some modes operation, perhaps including normal operation, the bus tie(s) 1231, 1241 are open so that electrical power cannot flow between the channels 123*a*, 124*a* associated with the first engine 110*a* and the channels 123*b*, 124*b* associated with the second engine 110*b*. However, the bus tie(s) 1231, 1241 are closed for the purposes of performing a cross-engine restart and possibly the management of some fault conditions, for example a fault in one or more electric machines of an engine.

In this example, a current limiting diode (CLD) 1232, sometimes referred to as a constant-current diode or current-regulating diode (CRD), is provided between the first and third power channels 123*a*, 123*b* so that when the bus tie 1231 is closed, the amount of current which can flow between the two connected power channels 123*a*, 123*b* is limited. This may protect one side of the electrical system (e.g. power channel 123*a*) and its connected loads (e.g. electric machines 111*a*, 112*a*) from faults, failures, transients and the like which may occur on the other side of the electrical system. A CLD 1242 is likewise connected between the second and fourth power channels 124*a*, 124*b*. In preferred embodiments each CLD 1232, 1242 is bi-directional so that fault currents are limited in both directions. A bi-directional arrangement can be obtained by connecting two uni-directional CLDs in anti-parallel, for example.

The power and propulsion system 100 preferably further includes an electrical energy storage system (ESS) 130. In preferred embodiments the ESS 130 takes the form of a rechargeable battery pack or module 131, formed from lithium-ion cells or cells of another suitable type. As illustrated by the dashed lines, the ESS is connected with the electrical system 120, possibly via a dc-dc power electronics converter 132 for conditioning the power and matching it to voltage of dc electrical system 130. In this embodiment it can be seen that the ESS is connected with each of the dc power channels 123*a-b*, 124*a-b*. The ESS 130 may be used for a variety of purposes, some of which will be described below and with reference to FIG. 6.

The ESS 130 may be used to supply electrical power as part of an initial ground-based electric engine start. In some embodiments, a first engine (e.g. engine 110*a*) is electrically started using power from the ESS 130. The second engine 110*b* may then be electrically started without assistance, or with reduced assistance, from the ESS 130 using power generated by the machines 111*a*, 111*b* of the first engine 110*a* and transferred via the closed bus tie(s) 1231, 1241.

The ESS 130 may be used to supply electrical power to one or more of the electric machines 111*a-b*, 112*a-b* in an almost instantaneous manner so as to manage the surge margins of the engines 110*a*, 110*b*. To this end, in some embodiments a portion of the ESS 130 (for example, one or more battery modules or collection of battery cells) may be dedicated to supplying power to manage surge margin 'on the fly'. In other words, a portion of the ESS 130 may be used for this purpose and no other purpose so that this functionality is available when needed.

If an engine 110*a*, 110*b* shuts down during flight, the ESS 130 may be used to provide electrical power to one or more of the engine's electric machines 111, 112 to motor its spool(s) as part of an electrically-assisted engine restart attempt. To this end, in some embodiments, a portion of the ESS 130 may be dedicated to providing power to one or more of the electric machines 111, 112 of a shutdown engine. In other words, a portion of the ESS 130 may be used for this purpose and no other purpose so that this functionality is available when needed.

The ESS 130 may also be used to provide electrical power to one or more critical electrical loads when necessary (e.g. following a partial or total loss of electrical power generation due to a fault or failure), and a portion of the ESS 130 may be dedicated to providing power to said one or more critical loads. In other words, a portion of the ESS 130 may be used for this purpose and no other purpose so that this functionality is available when needed. The aircraft 1 may further include an Auxiliary Power Unit (APU) 200.

In some embodiments, one or more electric machines (not shown) driven by the APU 200 are used as an electrical power source to replace or supplement the power provided by the ESS 130 during an electric start of the first engine (e.g. engine 110*a*). In other embodiments, however, the APU 200 may not be used for this purpose, or may be entirely omitted from the aircraft 1 to reduce weight. In some instances, for example where the ESS 130 is not present or insufficiently charged and the APU is omitted or unable to provide power, a ground cart may be used to provide electrical power to start an engine.

An APU 200 is generally not capable of being started during flight. Thus, the aircraft may also further include a Ram Air Turbine (RAT) 250 or other emergency source of electrical power. In case of a loss of electrical power, the RAT 250 may be deployed, for example to charge the ESS 130 to allow an inflight restart attempt. In preferred embodiments, however, the RAT 250 may be omitted entirely to reduce aircraft weight, with the combination of the ESS 130 and the cross-engine electric restart function providing sufficient engine restart capability.

The power and propulsion system 100 further includes a control system 140. The control system 140, which can take any suitable form including a FADEC and may include one or more controllers and/or one or more functional modules, provides control of the engines 110*a*, 110*b* and electrical system 120, including the electrical machines 111, 112, ESS 130 and the associated power electronics 121*a*'-b', 121*a*"-b", 122*a*'-b', 122*a*"-b", 132. The control system 140 may, amongst other things, control: the configuration of the electrical system 120; the modes in which the electric machines 111, 112 of the engines 110*a*, 110*b* operate; the delivery of fuel into the combustion equipment 16 of the engines 110*a*, 110*b*; the mode of operation of the ESS 130 and/or APU 200; and parameters of the power electronics (e.g. switching frequencies and duty cycles of the semiconductor switches).

Compared with existing aircraft power and propulsion systems, the power and propulsion systems 100 of the present may have electric machines 111, 112 sized and designed so that a much greater amount of electrical power can be generated from the engine spools. Combined with dual spool power generation, this means various functions such as the simultaneous management of engine surge margin and charging of the ESS 130 are possible over a wide range of engine operating points.

Table 1 illustrates exemplary peak powers for the first machine 111 (coupled with the first spool, which may be a low-pressure or intermediate-pressure spool) and the second electric machine 112 (coupled with the second spool, which may be a high-pressure spool). The values are expressed as ratios, the divider being the peak engine thrust. For the avoidance of doubt, the 'peak thrust' is the peak dry thrust, which refers to the peak thrust without the use of any afterburner or reheat.

TABLE 1

| | Max. Power Rating/Max. Engine Thrust ($WN^{-1}$) | | |
|---|---|---|---|
| | Example 1 | Example 2 | Example 3 |
| Electric Machine 1 | 2.2 | 3.1 | 4.5 |
| Electric Machine 2 | 3.8 | 6.4 | 8.0 |
| Total | 6.0 | 9.5 | 12.5 |

For both the electric machine power and the engine thrust, the term 'peak' will be readily understood by those skilled in the art to refer to the 'rated' values, i.e. the maximum values for which the electric machine or engine are designed to operate in without causing damage to the components. As explained above, each electric machine 111, 112 may include multiple sub-machines 111', 111", 112', 112". In this case, the peak power an electric machine (e.g. electric machine 111) is the sum of the peak powers of each of its sub-machines 111', 111".

Table 2 illustrates exemplary maximum values of the fraction of the power extracted from the spools of an engine (e.g. 110, 110*a*) by its electric machines during flight. In other words, the maximum value of the following percentage to occur during a flight of the aircraft 1:

$$\text{Percentage} = \frac{\text{Electrical Power Generated from Spools}}{\text{Total Spool Power}} \times 100\%$$

TABLE 2

| | Example 1 | Example 2 | Example 3 |
|---|---|---|---|
| Electrical Power Extracted (kW) | 570 | 720 | 920 |

TABLE 2-continued

| | Example 1 | Example 2 | Example 3 |
|---|---|---|---|
| Total Engine Spool Power (LP + HP, MW) | 5.5 | 9.0 | 16.0 |
| Ratio | 10.4% | 8.0% | 5.8% |

It will be appreciated that whilst the above relates to a two-spool engine, the same percentage can be calculated for a three-spool engine. Furthermore, it will be appreciated that the absolute values of the spool power and electrical power generation are platform-dependent and will increase or decrease depending on the size of the platform and its engines.

Compared with existing aircraft power and propulsion systems, the ESS 130 of the power and propulsion system 100 of the present disclosure may be sized and designed so as to provide a greater amount of electrical power relative to the size of the platform 1. Table 3 illustrates exemplary ESS energy storage capacities as well peak power and propulsion system thrusts (i.e. the sum of the peak thrusts of all of the propulsive engines of the platform). A ratio, defined as the total energy storage capacity divided by the maximum rated thrust of the power and propulsion system is also provided.

TABLE 3

| | Example 1 | Example 2 | Example 3 |
|---|---|---|---|
| Energy Storage Capacity (kWh) | 25 | 100 | 240 |
| Peak Platform Thrust (kN) | 100 | 600 | 600 |
| Ratio ($WhN^{-1}$) | 0.25 | 0.17 | 0.40 |

Various modifications and alternatives to the specific embodiments illustrated in FIG. 4 will occur to those skilled in the art. For example:

i. Although only a twin-engine platform is illustrated, an aircraft could have more than two (e.g. four) propulsive gas turbine engines. An aircraft could also have a single engine, in which case the system 100 may be substantially the same but with the omission of the second engine 110*b* and the third and fourth power channels 123*b*, 124*b*.

ii. In the illustrated embodiments, the full power of each electric machine 111, 112 is split between two sub-machines 111', 111"; 112', 112". This need not be the case: each electric machine 111, 112 may be a single, larger electric machine of the full power rating. This may however reduce the fault-tolerance of the platform, and in particular may prevent functions such as cross-engine electric starting and restarting in the presence of one or more faults, for example a non-critical fault resulting in a partial or full loss of one or more of the electric machines.

iii. In principle each electric machine 111, 112 could have more than two (e.g. three or four) sub-machines, but the number will in practice be limited by space constraints.

iv. Whilst dual spool power generation is preferred, only one of the spools of the engine 110 may be provided with an electric machine in other embodiments. In other words, one of electric machine 111 and electric machine 112 may be omitted.

v. Whilst the illustrated embodiment has two dc power channels 123, 124 per engine 110, fewer than two (i.e. one) or more than two dc power channels could be provided. The use of a single power channel would reduce fault tolerance compared with two power channels. The use of more than two power channels could increase fault tolerance but at the cost of increased system weight and complexity.

vi. In a single-engine propulsion system, three dc power channels may be preferable. In this case each sub-machine may be connected with more than one power channel. Alternatively, each machine 111, 112 may comprise three sub-machines and each sub-machine may be connected with one of the three power channels.

vii. Whilst a battery is illustrated, the ESS 130 could take another form. It could, for example, additionally or alternatively include one or more supercapacitors. One or more fuel cells could also be used, though batteries are preferred because rechargeable battery cells are readily available.

FIG. 5

Figure 5:
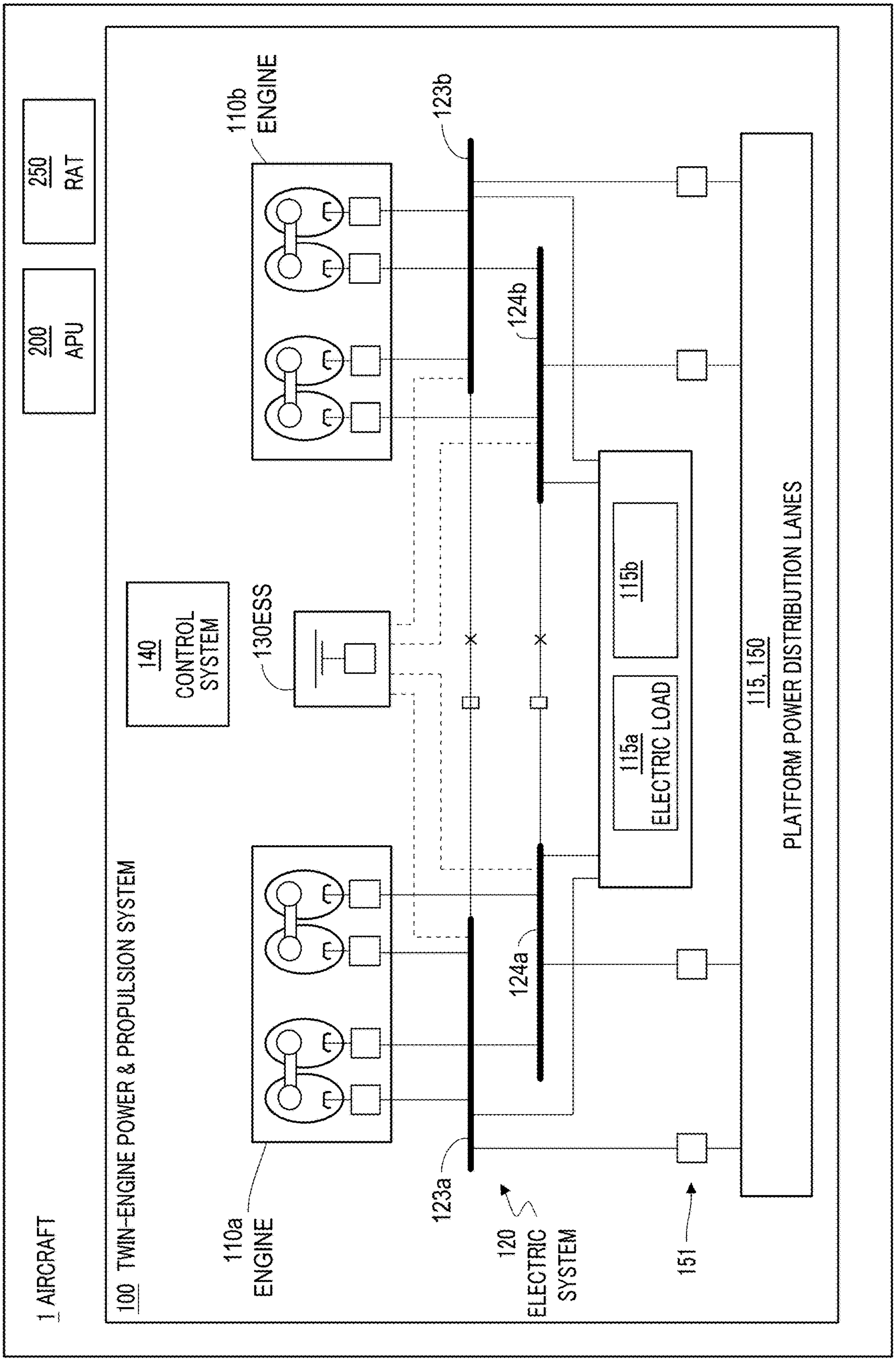
FIG. 5 is a schematic diagram of the twin-engine aircraft power and propulsion system of FIG. 4, further illustrating the distribution of power to electrical loads.

FIG. 5 shows the aircraft power and propulsion system 100 of FIG. 4, but with some further detail of the distribution of electrical power to electrical loads 115.

The dc power channels 123*a*-*b*, 124*a*-*b* are shown to supply electrical power to engine electrical loads 115*a*, 115*b*. In this particular example all four power channels can supply the engine electrical loads 115*a*, 115*b*, and they do so at the voltage level of the power channels. In one embodiment, the power channels 123*a*-*b*, 124*a*-*b* operate at 540V, though it will be appreciated other voltage levels and variable voltage levels may be used.

Exemplary engine electrical loads 115*a*, 115*b* include engine electric fuel pumps, which control the supply of fuel to the combustion equipment 16 of the engines 110*a*, 110*b*. The use of electric fuel pumps may improve the control of the supply of fuel to the combustor, allowing for more accurate control of the combustor fuel-to-air ratio, for example, whilst also reducing mechanical losses and heat generation associated with conventional, mechanically driven pumps. Other exemplary engine electrical loads 115*a*, 115*b* include electric oil pumps, electrical coolant pumps and various electrical actuators distributed about the engines 110*a*, 110*b*.

The dc power channels 123*a*-*b*, 124*a*-*b* also supply electrical power to one or more platform power distribution lanes 150, in this case via dc-dc converters 151. In some embodiments the platform power distribution lane(s) 150 operate at a lower voltage than the power channels 123*a*-*b*, 124*a*-*b*, for example 270V, in which case the dc-dc converters 151 step-down the voltage from the voltage of the power channels 123*a*-*b*, 124*a*-*b* to the voltage of the platform power distribution lane(s) 150.

The platform power distribution lane(s) 150 supply electrical power to platform electrical loads distributed about the aircraft 1. Exemplary electrical loads include electrical actuators, an environmental control system (ECS), wing anti-icing systems and the like. In a preferred embodiment, the platform power distribution lane(s) and the associated electrical loads are IT grounded. In some embodiments the converters 151 are bi-directional converters, such that electrical power can be transferred from the power distribution lanes 150 to the power channels 123*a*-*b*, 124*a*-*b* if desired.

FIG. 6

Figure 6:
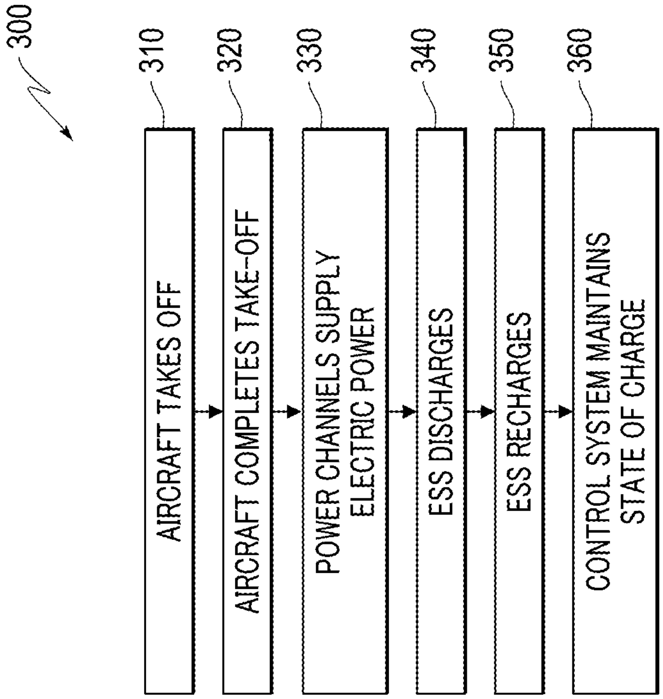
FIG. 6 is a flow chart of a method of operating a twin-engine aircraft power and propulsion system.

FIG. 6 is a flow chart illustrating a method 300 of operating an aircraft power and propulsion system 100 during a flight. Steps of the method 300 may be performed automatically or by a pilot of the aircraft 1 or a combination of the two, and may be performed under the control of a control system, for example the control system 140 of the power and propulsion system 100 of FIGS. 4 and 5.

The method 300 begins at 310, where the aircraft 1 takes off and climbs to a desired altitude.

In some embodiments, during the take-off and/or the climb, the ESS 130 supplies electrical power to one or more of the first to fourth electric machines 111*a-b*, 112*a-b* and said one or more electric machines are operated as motors to accelerate the associated spool(s). This may, for example, improve performance, reduce noise, reduce turbine temperatures and/or reduce fuel consumption during the take-off and climb. Additionally or alternatively, the ESS 130 may supply electrical power to one or more other electric loads (e.g. engine electric loads 115*a*, 115*b* or platform loads 150) during the take-off and/or climb to reduce the amount of power extracted from the spools during these flight phases.

At 320, the aircraft 1 has completed its take-off and initial climb. One or more and optionally all of the first to fourth electric machines 111*a-b*, 112*a-b* are operated as generators to extract mechanical power from their associated spools. The generated electrical power is used to supply various engine and platform electrical loads through the power channels 123*a-b*, 124*a-b*.

At 330, the power channels 123*a-b*, 124*a-b* supply electrical power generated by the electric machines 111*a-b*, 112*a-b* to charge the ESS 130. For example, if the ESS 130 was discharged during take-off and climb at step 310, the ESS 130 may be recharged to at least a minimum desired level at step 330. In some embodiments, the control system 140 may be configured to begin or complete the recharge process within a predetermined amount of time after the take-off and climb.

At 340, the ESS 130 discharges to supply one or more of the electric machines 111*a-b*, 112*a-b* with electrical power and said one or more electric machines are operated as motors. Additionally or alternatively, electrical power may be supplied to the said one or more electric machines from one or more of the other electric machines operating in a generator mode. In this way, the surge margin of the engines 110*a*, 110*b* can be managed, particularly during engine transients such as accelerations. The use of ESS 130 means power can be provided almost instantaneously in response to a determination to the effect that a surge margin of one or both engines is or is expected to be eroded. Step 340 may be performed intermittently as necessary.

At 350, having at least partially discharged the ESS 130 at step 340, the ESS 130 is recharged to at least a minimum desired level so that the surge margin maintenance function is available when needed. In particular, one or more and optionally all of the first to fourth electric machines 111*a-b*, 112*a-b* are operated as generators to extract mechanical power from their associated spools. The power channels 123*a-b*, 124*a-b* supply electrical power generated by the electric machines 111*a-b*, 112*a-b* to charge the ESS 130.

At 360, the control system 130 continues to maintain the state of charge of the ESS 130 at or above a desired minimum level. In this way, various functions such as the ability to maintain surge margin, the ability to perform an electrically-assisted engine restart following a planned or unplanned engine shutdown, or the ability to supply power to one or more electrical loads (e.g. critical electric loads such as fuel pumps) following a fault or failure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A twin-engine aircraft power and propulsion system, comprising:

a first propulsive gas turbine engine and a second propulsive gas turbine engine, each comprising combustion equipment and a plurality of spools including a first spool and a second spool;

a first electrical power generation sub-system comprising a first electric machine mechanically coupled with the first spool of the first propulsive gas turbine engine;

a second electrical power generation sub-system comprising a second electric machine mechanically coupled with the second spool of the first propulsive gas turbine engine;

a third electrical power generation sub-system comprising a third electric machine mechanically coupled with the first spool of the second propulsive gas turbine engine;

a fourth electrical power generation sub-system comprising a fourth electric machine mechanically coupled with the second spool of the second propulsive gas turbine engine;

a first power channel connected with a distribution side of the first electric machine of the first electrical power generation sub-system;

a second power channel connected with a distribution side of the second electric machine of the second electrical power generation sub-system;

a third power channel connected with a distribution side of the third electric machine of the third electrical power generation sub-system; and a fourth power channel connected with a distribution side of the fourth electric machine of the fourth electrical power generation sub-system, wherein a ratio, $P_{TOT}/T$, equal to a combined rated power of the first electric machine, the second electric machine, the third electric machine, and the fourth electric machine divided by a combined maximum thrust rating of the first propulsive gas turbine engine and the second propulsive gas turbine engine is greater than or equal to 4.5 $WN^{-1}$ and less than 15.0 $WN^{-1}$, each of the first electric machine, the second electric machine, the third electric machine, and the fourth electric machine comprises a first sub-machine and a second sub-machine;

the first power channel, the second power channel, the third power channel and the fourth power channel are different power channels;

the first power channel is a de power channel, is connected with a distribution side of the first sub-machine of the first electric machine via a first ac-dc converter, and is connected with a distribution side of the first sub-machine of the second electric machine via a second ac-dc converter;

the second power channel is a dc power channel, is connected with a distribution side of the second sub-machine of the first electric machine via a third ac-dc converter, and is connected with a distribution side of the second sub-machine of the second electric machine via a fourth ac-dc converter;

the third power channel is a dc power channel, is connected with a distribution side of the first sub-machine of the third electric machine via a fifth ac-dc converter, and is connected with a distribution side of the first sub-machine of the fourth electric machine via a sixth ac-dc converter; and the fourth power channel is a dc power channel, is connected with a distribution side of the second sub-machine of the third electric machine via a seventh ac-dc converter, and is connected with a distribution side of the second sub-machine of the fourth electric machine via an eighth ac-dc converter.

2. The twin-engine aircraft power and propulsion system of claim 1, further comprising:

a first bus tie operable to connect together the first power channel and the third power channel, whereby electrical power generated by the first electrical power generation sub-system can be transferred to the third electrical power generation sub-system and vice versa; and a second bus tie operable to connect together the second power channel and the fourth power channel, whereby electrical power generated by the second electrical power generation sub-system can be transferred to the fourth electrical power generation sub-system and vice versa.

3. The twin-engine aircraft power and propulsion system of claim 2, further comprising current limiting diodes operable to limit an amount of current that can flow between the first power channel and the third power channel and to limit an amount of current that can flow between the second power channel and the fourth power channel.

4. The twin-engine aircraft power and propulsion system of claim 2, further comprising a control system configured to selectively open and close the first bus tie and the second bus tie according to a detected condition of the twin-engine aircraft power and propulsion system.

5. The twin-engine aircraft power and propulsion system of claim 1, wherein one or more of the first electric machine, the second electric machine, the third electric machine, and the fourth electric machine are embedded with a core of the respective propulsive gas turbine engine.

6. The twin-engine aircraft power and propulsion system of claim 1, in which each of the first propulsive gas turbine engine and the second propulsive gas turbine engine further comprises an electrically powered fuel pump arranged to receive electrical power from one or more of the first electric channel, the second electric channel, the third electric channel, or the fourth electric channel and to supply fuel to the combustion equipment.

7. The twin-engine aircraft power and propulsion system of claim 1, in which a ratio, $P_1/T$, equal to a combined rated power of the first electric machine and the third electric machine divided by a combined maximum thrust rating of the first propulsive gas turbine engine and the second propulsive gas turbine engine is greater than or equal to 2.0 $WN^{-1}$ and less than 7.0 $WN^{-1}$.

8. The twin-engine aircraft power and propulsion system of claim 1, in which a ratio, $P_2/T$, equal to the combined rated power of the second electric machine and the fourth electric machine divided by the combined maximum thrust rating of the first propulsive gas turbine engine and the second propulsive gas turbine engine is greater than or equal to 3.5 $WN^{-1}$ and less than 10.0 $WN^{-1}$.

9. The twin-engine aircraft power and propulsion system of claim 1, further comprising an electrical energy storage system connected with each of the first electric channel, the second electric channel, the third electric channel, or the fourth electric channel, and wherein a ratio defined as a total energy storage capacity of the electrical energy storage system divided by a combined maximum rated thrust of the first propulsive gas turbine engine and the second propulsive gas turbine engine is greater than or equal to 0.1 $WhN^{-1}$ and less than 0.50 $WhN^{-1}$.

10. The twin-engine aircraft power and propulsion system of claim 9, in which the ratio is between 0.15 and 0.50 $WhN^{-1}$.

11. The twin-engine aircraft power and propulsion system of claim 9, in which a portion of the electrical energy storage system is dedicated to supplying electrical power to one or more electrical loads during engine restart attempts.

12. The twin-engine aircraft power and propulsion system of claim 11, in which the one or more electrical loads comprise one or more of:

one or more of the first electric machine, the second electric machine, the third electric machine, or the fourth electric machine; and/or one or more electrically powered fuel pumps configured to supply fuel to the combustion equipment of the first propulsive gas turbine engine and the second propulsive gas turbine engine.

13. The twin-engine aircraft power and propulsion system of claim 9, in which a portion of the electrical energy storage system is dedicated to supplying electrical power to one or more of the first electric machine, the second electric machine, the third electric machine, or the fourth electric machine to manage surge margins and/or turbine temperatures of the first propulsive gas turbine engine and the second propulsive gas turbine engine.

14. The twin-engine aircraft power and propulsion system of claim 1, further comprising one or more platform power distribution lanes connected with each of the first electric machine, the second electric machine, the third electric machine, and the fourth electric machine, the one or more platform power distribution lanes being IT grounded.

15. An aircraft comprising the twin-engine aircraft power and propulsion system of claim 1.

16. The twin-engine aircraft power and propulsion system of claim 1, wherein the maximum thrust rating is a dry thrust rating without using reheat or afterburner.

* * * * *